United States Patent
Kitamori et al.

(10) Patent No.: US 8,643,727 B2
(45) Date of Patent: Feb. 4, 2014

(54) ELECTRONIC DEVICE RELATED TO AUTOMATIC TIME SETTING

(75) Inventors: Yutaka Kitamori, Osaka (JP); Takafumi Hayashi, Osaka (JP); Kiyoshi Kobayashi, Osaka (JP); Masaaki Sugimori, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 713 days.

(21) Appl. No.: 12/487,115

(22) Filed: Jun. 18, 2009

(65) Prior Publication Data

US 2009/0316004 A1 Dec. 24, 2009

(30) Foreign Application Priority Data

Jun. 18, 2008 (JP) ................................. 2008-158712

(51) Int. Cl.
*H04N 5/225* (2006.01)
(52) U.S. Cl.
USPC ................... 348/207.1; 348/207.11; 348/510
(58) Field of Classification Search
USPC ......... 348/207.1, 512, 510, 515, 552, 207.11, 348/207.2; 386/231
See application file for complete search history.

(56) References Cited

U.S. PATENT DOCUMENTS

| | | | | |
|---|---|---|---|---|
| 6,980,232 | B2* | 12/2005 | Suzuki ........................ | 348/207.1 |
| 7,187,403 | B2* | 3/2007 | Gu et al. .................... | 348/207.1 |
| 7,821,573 | B2* | 10/2010 | Onoue .......................... | 348/460 |
| 2004/0032498 | A1* | 2/2004 | Wyn-Harris et al. ...... | 348/207.1 |
| 2004/0036774 | A1* | 2/2004 | Nichols et al. ............. | 348/207.1 |
| 2004/0095512 | A1 | 5/2004 | Miyake | |
| 2004/0174440 | A1* | 9/2004 | Kojima et al. ............. | 348/222.1 |
| 2005/0041103 | A1* | 2/2005 | Kinjo .......................... | 348/207.1 |
| 2005/0084242 | A1* | 4/2005 | Mizutani et al. ................ | 386/94 |
| 2006/0031589 | A1* | 2/2006 | Wang et al. .................... | 709/248 |
| 2006/0198605 | A1 | 9/2006 | Onoue | |
| 2007/0002144 | A1* | 1/2007 | Tsuchida et al. ........... | 348/207.1 |
| 2008/0133249 | A1* | 6/2008 | Hashiguchi et al. .......... | 704/500 |
| 2008/0180551 | A1* | 7/2008 | Koike ....................... | 348/231.99 |
| 2009/0109988 | A1* | 4/2009 | Musunuri et al. ............. | 370/412 |

FOREIGN PATENT DOCUMENTS

| | | |
|---|---|---|
| JP | 2002-55180 A | 2/2002 |
| JP | 2002-300482 A | 10/2002 |
| JP | 2006-242841 A | 9/2006 |
| JP | 2007027855 | 2/2007 |
| JP | 2008-92206 A | 4/2008 |

OTHER PUBLICATIONS

English Translation of Notification of Reasons for Refusal issued by the Japan Patent Office in Japanese Patent Application No. 2008-158712; dated Oct. 9, 2012; 3 pages.

(Continued)

*Primary Examiner* — Tuan Ho
(74) *Attorney, Agent, or Firm* — NDQ&M Watchstone LLP

(57) ABSTRACT

An electronic device having a clock portion for counting time and having the time on the clock portion set based on time information acquired from outside has a notification portion that communicates information of the time counted by the clock portion to an external device via a physical line. Alternatively, an electronic device has a first clock portion counting time and an acquisition portion that acquires, from an external device having a second clock portion for counting time and having the time on the second clock portion set based on time information acquired from outside, information of the time counted by the second clock portion via a physical line, and the time on the first clock portion is set based on the information acquired by the acquisition portion.

6 Claims, 8 Drawing Sheets

(56) References Cited

OTHER PUBLICATIONS

Japanese version of Notification of Reasons for Refusal issued by the Japan Patent Office in Japanese Patent Application No. 2008-158712; dated Oct. 9, 2012; 3 pages.
English translation of Japanese Publication No. 2008-092206; downloaded Oct. 9, 2012; 1 page.
English translation Japanese Publication No. 2002-055180; dated Feb. 20, 2002; downloaded Oct. 9, 2012; 2 pages.
Chinese Office Action for Chinese Application No. 200910163940.1, mailed on Jun. 6, 2012, 6 pages.
English translation of Chinese Office Action for Chinese Application No. 200910163940.1, mailed on Jun. 6, 2012, 7 pages.

* cited by examiner

Fig.8A

| DATA | CONTENTS | EXAMPLE |
|---|---|---|
| 1byte | Address | 0x** |
| 2byte | OP_Code | 0x89 |
| 3byte | TIME INFORMATION NOTIFICATION | 0x10 |
| 4byte | Year:VALUE FROM 0 TO 99 | |
| 5byte | Month:VALUE FROM 1 TO 12 | |
| 6byte | Day:VALUE FROM 1 TO 31 | |
| 7byte | Hour:VALUE FROM 0 TO 23 | |
| 8byte | Minute:VALUE FROM 0 TO 59 | |

Fig.8B

| DATA | CONTENTS | EXAMPLE |
|---|---|---|
| 1byte | Address | 0x** |
| 2byte | OP_Code | 0x89 |
| 3byte | TIME INFORMATION REQUEST | 0x11 |

ELECTRONIC DEVICE RELATED TO AUTOMATIC TIME SETTING

This application is based on Japanese Patent Application No. 2008-158712 filed on Jun. 18, 2008, the contents of which are hereby incorporated by reference.

BACKGROUND OF THE INVENTION

1. Field of the Invention

The present invention relates to automatic time (clock) setting in an electronic device.

2. Description of Related Art

Nowadays, digital home electronic appliances are widely spread, which include some, such as digital televisions, which can acquire time information automatically by receiving a digital broadcast wave, and others, such as digital movie cameras, which cannot acquire time information automatically.

With a device that cannot acquire time information automatically, the user needs to set the time manually at its purchase, and on the occasions of replacement of a battery, updating of software, etc. as well. Depending on the device, the time so set may lead or lag by several seconds a month; thus the time needs to be set correct again whenever the error has become unduly large. Also, it is expected that, if a system of daylight saving time (summer time) is introduced in the future, the time will then need to be set correct regularly.

An object of the present invention is to provide an automatic time setting system that enables automatic time setting on an electronic device that on its own requires manual setting of the time.

SUMMARY OF THE INVENTION

To achieve the above object, according to one aspect of the invention, an electronic device having a clock portion for counting time and having the time on the clock portion set based on time information acquired from outside, the electronic device comprises a notification portion that communicates information of the time counted by the clock portion to an external device via a physical line (that is, wiredly).

To achieve the above object, according to another aspect of the invention, an electronic device comprises a first clock portion counting time and an acquisition portion that acquires, from an external device having a second clock portion for counting time and having the time on the second clock portion set based on time information acquired from outside, information of the time counted by the second clock portion via a physical line. Here, the time on the first clock portion is set based on the information acquired by the acquisition portion.

BRIEF DESCRIPTION OF THE DRAWINGS

FIG. 8A is a diagram showing the format of a time information notification command; and FIG. 8B is a diagram showing the format of a time information request command.

DETAILED DESCRIPTION OF PREFERRED EMBODIMENTS

Embodiments of the present invention will be described below with reference to the accompanying drawings.

Figure 1:
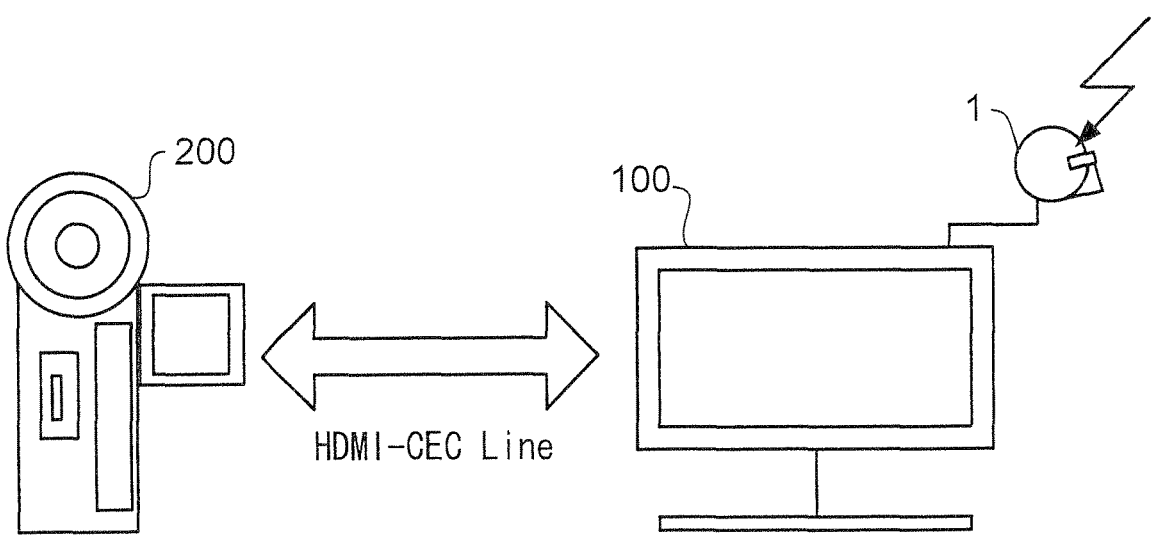
FIG. 1 is an overall schematic diagram of an automatic time setting system according to one embodiment of the invention.

FIG. 1 is an overall schematic diagram of an automatic time setting system according to one embodiment of the invention. The automatic time setting system according to one embodiment of the invention comprises a digital television 100 and a digital movie camera 200. The digital television 100 can automatically acquire time information contained in a digital broadcast wave received via an antenna 1, and can automatically set the time. The digital movie camera 200 on its own cannot automatically acquire time information, and requires manual time setting. The digital television 100 and the digital movie camera 200 are therefore connected together by an HDMI (High-Definition Multimedia Interface) cable so that, via an HDMI-CEC (Consumer Electronics Control) line, which allows two-way communication, time information is communicated from the digital television 100 to the digital movie camera 200 to enable automatic time setting on the digital movie camera 200.

Figure 2:
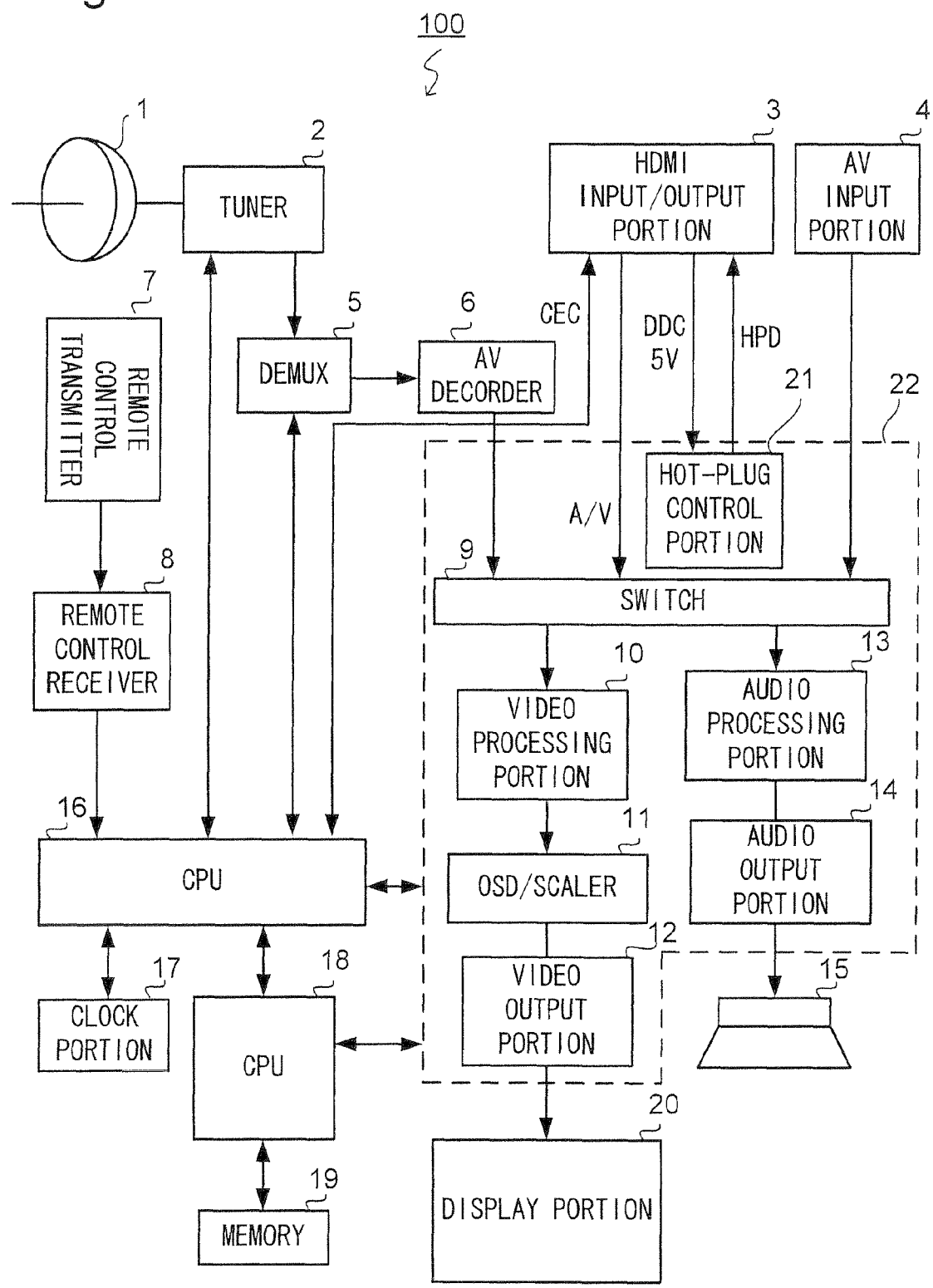
FIG. 2 is a schematic configuration diagram of a digital television according to one embodiment of the invention.

FIG. 2 is a schematic configuration diagram of a digital television according to one embodiment of the invention. The digital television 100 according to one embodiment of the invention comprises a tuner 2, an HDMI input/output portion 3, an AV input portion 4, a DEMUX (demultiplexer) 5, an AV decoder 6, a remote control receiver 8, a switch 9, a video processing portion 10, an OSD/scaler 11, a video output portion 12, an audio processing portion 13, an audio output portion 14, a loudspeaker 15, a CPU 16, a clock portion 17, a CPU 18, a memory 19, a display portion 20, and a hot-plug control portion 21.

The antenna 1 is installed outdoors, receives a digital broadcast wave, and outputs a high-frequency digital modulated signal to the tuner 2.

The tuner 2 extracts from the high-frequency digital modulated signal a signal of a particular frequency. The tuner 2 then decodes the selected digital modulated signal to output a transport stream to the DEMUX 5.

The DEMUX 5 separates the transport stream into a video stream and an audio stream confirming to MPEG2 (Moving Picture Expert Group 2), PSI/SI (Program Specific Information/Service Information), etc.

The AV decoder 6 comprises a video decoder that decodes the video stream and an audio decoder that decodes the audio stream, and outputs the decoded video and audio information to the switch 9.

The HDMI input/output portion 3 has three unillustrated HDMI terminals, to which an HDMI cable can be connected. Video/audio information inputted from an external device via a video/audio signal line included in the HDMI cable is inputted to the switch 9. CEC commands inputted from the external device via an HDMI-CEC line included in the HDMI cable is inputted to the CPU 16. CEC commends outputted from the CPU 16 to the HDMI input/output portion 3 is inputted via the HDMI-CEC line to the external device. Moreover, 5 V supply electric power is fed from the external device via a DDC5V line included in the HDMI cable and via the HDMI input/output portion 3 to the hot-plug control portion 21. The hot-plug control portion 21 outputs a control signal to the HDMI input/output portion 3 thereby to control the level (low/high) of a hot-plug line.

The AV input portion 4 has an S terminal and a D terminal, neither of which is illustrated. Video/audio information inputted from an external device via an S- or D-terminal cable is outputted to the switch 9.

The switch 9 is a switch that switches among the video/audio inputs from the AV decoder 6, the HDMI input/output portion 3, and the AV input portion 4. The video processing portion 10 performs digital video processing on the video information fed to it via the switch 9. The OSD/scaler 11 is a circuit that generates video data based on character information and color information specified from the CPU 18, and that performs processing for reducing received broadcast video. The OSD/scaler 11 achieves display of an EPG (electronic program guide) based on broadcast program information, display of data broadcast, display of menu screens, etc. The video output portion 12 coverts the video information inputted to it from the OSD/scaler 11 into a format of an input signal to the display portion 20. The display portion 20 displays video based on the video signal inputted to it from the video output portion 12.

The audio processing portion 13 receives audio information via the switch 9, and performs D/A conversion on it to output an analog audio signal to the audio output portion 14. The audio output portion 14 amplifies and otherwise processes the audio signal inputted to it from the audio processing portion 13, and outputs the result to the loudspeaker 15. The loudspeaker 15 reproduces sounds based on the audio signal inputted to it from the audio output portion 14.

A remote control transmitter 7 is a transmitter for feeding commands to the digital television 100. When a key provided on the remote control transmitter 7 is operated, a remote control signal corresponding to the key is transmitted from a light-emitting portion of the remote control transmitter 7. The remote control receiver 8 receives the remote control signal, converts it into an electrical signal, and feeds the result to the CPU 16.

The CPU 16 mainly performs processing on remote control signals from the remote control transmitter 7 and on signals resulting from keys on an unillustrated operation portion being operated, and controls the tuner 2 etc. Even when the power is turned off by the remote control transmitter 7, the CPU 16 keeps being supplied with electric power so as to keep operating to perform processing such as monitoring of remote control signals. On the other hand, the CPU 18 mainly controls the OSD/scaler 11, the video processing portion 10, the display portion 20, etc. The CPUs 16 and 18 can communicate with each other so that, under the control of the CPU 16, the CPU 18 and the individual blocks in a video/audio processing portion 22 can be stopped and started. The memory 19 stores control programs and various kinds of data.

The clock portion 17 keeps time to feed current time information to the CPU 16, and sets the time based on time information fed from the CPU 16.

Figure 3:
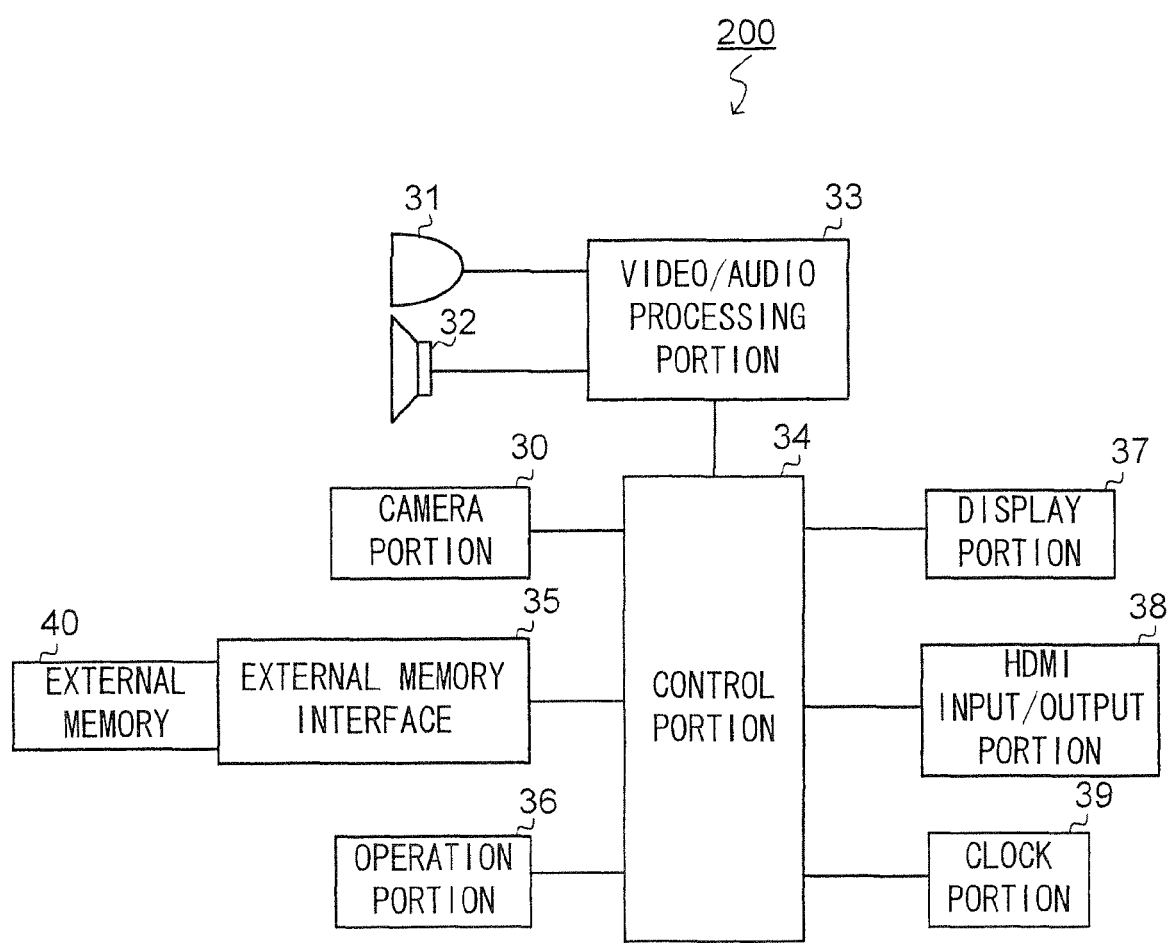
FIG. 3 is a schematic configuration diagram of a digital movie camera according to one embodiment of the invention.

FIG. 3 is a schematic configuration diagram of a digital movie camera 200 according to one embodiment of the invention. The digital movie camera 200 according to one embodiment of the invention comprises a camera portion 30, a microphone 31, a loudspeaker 32, a video/audio processing portion 33, a control portion 34, an external memory interface 35, an operation portion 36, a display portion 37, an HDMI input/output portion 38, and a clock portion 39.

During movie shooting, information of the video shot by the camera portion 30 is subjected to compression processing by the video/audio processing portion 33, and is recorded, via the external memory interface 35, to an external memory 40. During sound recording, information of the audio inputted via the microphone 31 is subjected to compression processing by the video/audio processing portion 33, and is recorded to the external memory 40.

During movie playback, information of video read out from the external memory 40 is subjected to decompression processing by the video/audio processing portion 33, so that a movie is displayed on the display portion 37. During sound playback, information of audio read out from the external memory 40 is subjected to decompression processing by the video/audio processing portion 33, so that sounds are reproduced from the loudspeaker 32.

In a case where movie playback and/or sound playback is performed on an external device connected to the digital movie camera 200 by an HDMI cable, information on video and/or audio read out from the external memory 40 is subjected to decompression processing by the video/audio processing portion 33, and is then transferred from the HDMI input/output portion 38 to the external device in a format conforming to TMDS (Transition Minimized Differential Signaling). The control portion 34 performs processing for CEC communication with the external device via the HDMI input/output portion 38.

The clock portion 39 keeps time to feed current time information to the control portion 34, and sets the time based on time information fed from the control portion 34. The operation portion 36 has various keys for giving instructions to the digital movie camera 200.

Next, automatic time setting operation according to one embodiment of the invention will be described. Here, it is assumed that the digital television 100 and the digital movie camera 200 are connected together by an HDMI cable, and that, in the digital television 100, time information contained in the PSI/SI separated from a transport stream by the DEMUX 5 is regularly fed to the clock portion 17 by the CPU 16 so that, based on that time information, the clock portion 17 sets the time.

Figure 4:
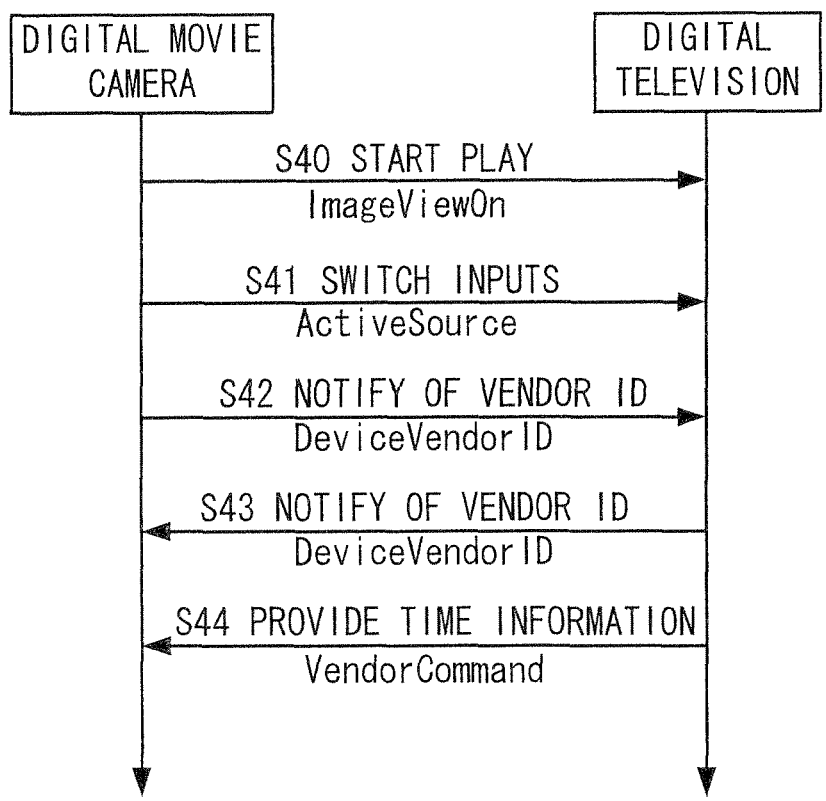
FIG. 4 is a diagram showing a CEC communication sequence at the time of starting playback on the digital movie camera.

At Start of Playback on Digital Movie Camera: FIG. 4 shows a CEC communication sequence at the time of starting playback on the digital movie camera. First, when the operation portion 36 of the digital movie camera 200 is so operated as to start playback, at step S40, the control portion 34 transmits a playback start command (Image View On), which notifies of the start of playback, to the digital television 100 via the HDMI input/output portion 38 and via the HDMI-CEC line. The CPU 16 of the digital television 100 thus receives the playback start command via the HDMI input/output portion 3.

Then, at step S41, the control portion 34 of the digital movie camera 200 transmits an input switch command (Active Source) to the digital television 100 via the HDMI input/output portion 38 and via the HDMI-CEC line. The CPU 16 of the digital television 100 thus receives the input switch command via the HDMI input/output portion 3, and switches the switch 9 for the video/audio input from the HDMI input/output portion 3. Thus, playback video/audio information from the digital movie camera 200 is inputted via the HDMI input/output portion 3 to the switch 9, so that the display portion 20 displays video and the loudspeaker 15 reproduces sounds.

Then, at step S42, the control portion 34 of the digital movie camera 200 transmits a vendor ID notification command (Device Vendor ID), which notifies of a vendor ID, to the digital television 100 via the HDMI input/output portion 38 and via the HDMI-CEC line. The CPU 16 of the digital television 100 thus receives the vendor ID notification command, and if it verifies that the received vendor ID notification command indicates a predetermined vendor, then at step S43, the CPU 16 transmits a vendor ID notification command to the digital movie camera 200 via the HDMI input/output portion 3 and via the HDMI-CEC line. The control portion 34 of the digital movie camera 200 thus receives the vendor ID notification command via the HDMI input/output portion 38, and verifies whether or not the received vendor ID notification command indicates a predetermined vendor.

Then, at step S44, the CPU 16 of the digital television 100 transmits a time information notification command, which contains information of the current time counted by the clock portion 17, to the digital movie camera 200 via the HDMI input/output portion 3 and via the HDMI-CEC line.

FIG. 8A shows the format of the time information notification command. At the head comes address information on the destination, followed by information indicating the command type (OP_Code). This information is, for example, 0x89 to indicate a Vendor Command. Next comes information (for example, 0x10) that indicates, among different Vendor Commands, a time information notification command. To follow are individual items of information indicating the year, month, day, hour, and minute of the current time.

Since the current time information contained in the time information notification command does not include information on the second, it is when the clock portion 17 counts a change in the minute that the CPU 16 transmits the time information notification command to the digital movie camera 200. The control portion 34 of the digital movie camera 200 then receives the time information notification command via the HDMI input/output portion 38, and feeds the current time information contained in the time information notification command to the clock portion 39, so that, based on the current time information fed to it, the clock portion 39 sets the time. At this time, the second of the time is set to 0.

After the transmission of the time information notification command at a change in the minute as described above, the time information notification command may be transmitted at the next increment in the minute again, to set the time on the digital movie camera 200 again. On the other hand, in a case where information on the second is added to the current time information contained in the time information notification command, the time information notification command is transmitted immediately, instead of at a change in the minute as described above. This applies to other embodiments described below as well.

Figure 5:
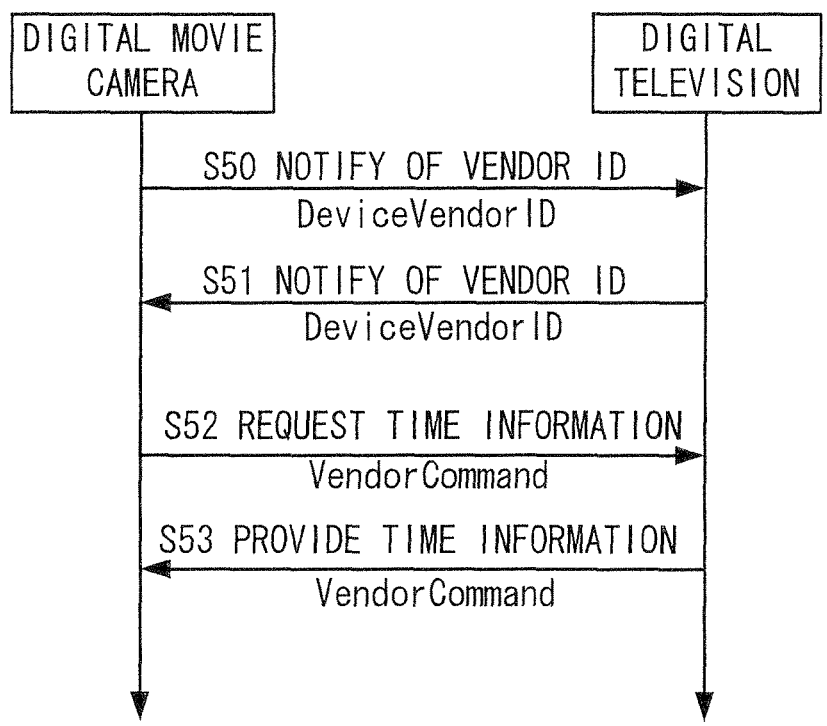
FIG. 5 is a diagram showing a CEC communication sequence at the time of displaying a time setting screen on the digital movie camera.

At Display of Time Setting Screen on Digital Movie Camera: FIG. 5 shows a CEC communication sequence at the time of displaying a time setting screen on the digital movie camera. First, when the operation portion 36 of the digital movie camera 200 is so operated as to display a time setting screen, the control portion 34 displays a time setting screen on the display portion 37 and, at step S50, transmits a vendor ID notification command (Device Vendor ID) to the digital television 100 via the HDMI input/output portion 38 and via the HDMI-CEC line.

The CPU 16 of the digital television 100 thus receives the vendor ID notification command via the HDMI input/output portion 3, and if it verifies that the received vendor ID notification command indicates a predetermined vendor, then at step S51, the CPU 16 transmits a vendor ID notification command to the digital movie camera 200 via the HDMI input/output portion 3 and via the HDMI-CEC line. The control portion 34 of the digital movie camera 200 thus receives the vendor ID notification command via the HDMI input/output portion 38, and if it verifies that the received vendor ID notification command indicates a predetermined vendor, then at step S52, the control portion 34 transmits a time information request command (Vendor Command), which requests time information, to the digital television 100 via the HDMI input/output portion 38 and via the HDMI-CEC line.

FIG. 8B shows the format of the time information request command. At the head comes address information on the destination, followed by information indicating the command type (OP_Code). This information is, for example, 0x89 to indicate a Vendor Command. Next comes information (for example, 0x11) that indicates, among different Vendor Commands, a time information request command.

Then, when the CPU 16 of the digital television 100 receives the time information request command via the HDMI input/output portion 3, an advance is made to step S53. At step S53, when the clock portion 17 counts a change in the minute, the CPU 16 transmits a time information notification command (Vendor Command), which contains information of the current time counted by the clock portion 17, to the digital movie camera 200 via the HDMI input/output portion 3 and via the HDMI-CEC line. The control portion 34 of the digital movie camera 200 thus receives the time information notification command via the HDMI input/output portion 38, and feeds the current time information contained in the received time information notification command to the clock portion 39, so that, based on the current time information fed to it, the clock portion 39 sets the time. At this time, the second of the time is set to 0.

Figure 6:
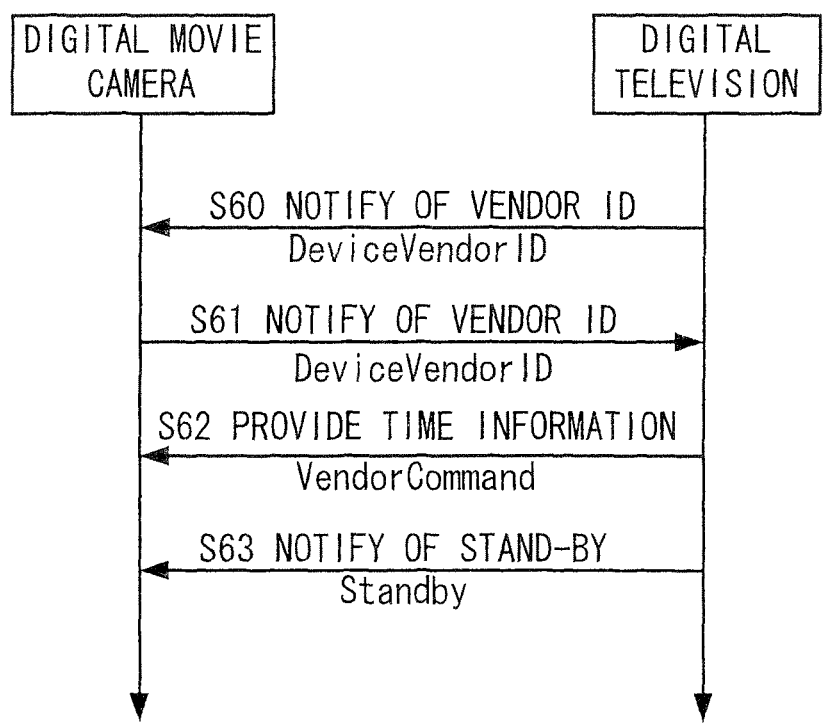
FIG. 6 is a diagram showing a CEC communication sequence at the time of transition into a stand-by state on the digital movie camera.

At Transition into Stand-by State on Digital Movie Camera: FIG. 6 shows a CEC communication sequence at the time of transition into a stand-by state on the digital movie camera. Here, the stand-by state denotes a power-saving state in which electric power is kept supplied only to those circuits that need to be in operation all the time. First, when the remote control transmitter 7 for the digital television 100 is so operated as to shift the digital movie camera 200 into the stand-by state, then at step S60, the CPU 16 transmits a vendor ID notification command (Device Vendor ID) to the digital movie camera 200 via the HDMI input/output portion 3 and via the HDMI-CEC line.

The control portion 34 of the digital movie camera 200 thus receives the vendor ID notification command via the HDMI input/output portion 38, and if it verifies that the received vendor ID notification command indicates a predetermined vendor, then at step S61, the control portion 34 transmits a vendor ID notification command to the digital television 100 via the HDMI input/output portion 38 and via the HDMI-CEC line.

The CPU 16 of the digital television 100 thus receives the vendor ID notification command via the HDMI input/output portion 3, and if it verifies that the received vendor ID notification command indicates a predetermined vendor, an advance is made to step S62. At step S62, when the clock portion 17 counts a change in the minute, the CPU 16 transmits a time information notification command (Vendor Command), which contains information of the current time counted by the clock portion 17, to the digital movie camera 200 via the HDMI input/output portion 3 and via the HDMI-CEC line. The control portion 34 of the digital movie camera 200 thus receives the time information notification command via the HDMI input/output portion 38, and feeds the current time information contained in the received time information notification command to the clock portion 39, so that, based on the current time information fed to it, the clock portion 39 sets the time. At this time, the second of the time is set to 0.

Then, at step S63, the CPU 16 of the digital television 100 transmits a stand-by notification command (Standby) to the digital movie camera 200 via the HDMI input/output portion 3 and via the HDMI-CEC line. The control portion 34 of the digital movie camera 200 thus receives the stand-by notification command via the HDMI input/output portion 38, and shifts the digital movie camera 200 into the stand-by state.

Figure 7:
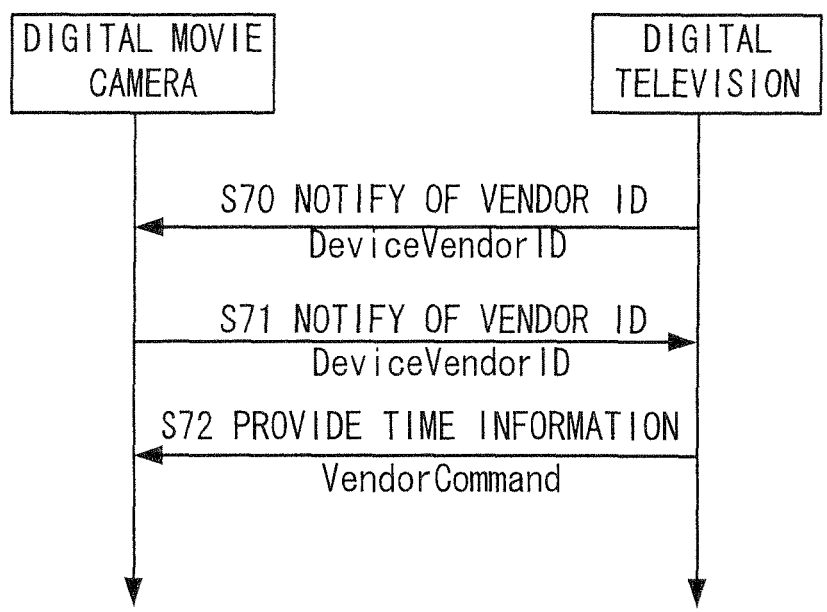
FIG. 7 is a diagram showing a CEC communication sequence at the time of automatic time setting on the digital television.

At Automatic Time Setting on Digital Television: FIG. 7 shows a CEC communication sequence at the time of automatic time setting on the digital television. When the CPU 16 feeds the time information contained in the PSI/SI separated from the transport stream by the DEMUX 5 to the clock portion 17 for time setting, at step S70, the CPU 16 transmits a vendor ID notification command (Device Vendor ID) to the digital movie camera 200 via the HDMI input/output portion 3 and via the HDMI-CEC line.

The control portion 34 of the digital movie camera 200 thus receives the vendor ID notification command via the HDMI input/output portion 38, and if it verifies that the received vendor ID notification command indicates a predetermined vendor, then at step S71, the control portion 34 transmits a vendor ID notification command to the digital television 100 via the HDMI input/output portion 38 and via the HDMI-CEC line.

The CPU 16 of the digital television 100 thus receives the vendor ID notification command via the HDMI input/output portion 3, and if it verifies that the received vendor ID notification command indicates a predetermined vendor, an advance is made to step S72. In step S72, when the clock portion 17 counts a change in the minute, the CPU 16 transmits a time information notification command (Vendor Command), which contains information of the current time counted by the clock portion 17, to the digital movie camera 200 via the HDMI input/output portion 3 and via the HDMI-CEC line. The control portion 34 of the digital movie camera 200 thus receives the time information notification command via the HDMI input/output portion 38, and feeds the current time information contained in the received time information notification command to the clock portion 39, so that, based on the current time information fed to it, the clock portion 39 sets the time. At this time, the second of the time is set to 0.

As described above, according to the present invention, even a digital movie camera 200 that on its own requires manual time setting can acquire time information from the digital television 100 connected to it by an HDMI cable and set the time automatically. This permits the digital movie camera 200 to have a capability equivalent to the automatic time setting capability of the digital television 100.

The embodiments described above are simply examples, and allow any modifications and variations unless departing from the spirit of the invention. For example, the digital television 100 may be connected by an HDMI cable to a power supply cradle on which the digital movie camera 200 is mounted so that the digital movie camera 200 acquires time information from the digital television 100 via the HDMI cable and the power supply cradle.

For example, another possible embodiment is one in which a PC that acquires time information from a server over the Internet and that sets the time automatically may be connected to a device such as a digital movie camera via a USB (Universal Serial Bus) so that the device acquires time information from the PC and sets the time automatically.

What is claimed is:

1. An electronic device having a clock portion for counting time and having time on the clock portion set based on time information acquired from outside, the electronic device comprising:
   a notification portion that communicates information of the time counted by the clock portion to an external device via a physical line;
   wherein the notification portion communicates the information on at least one of the following occasions: after the external device, by being so operated as to display a time information setting screen, displays the time information setting screen on the display portion; and when the external device shifts into a stand-by state.

2. The electronic device according to claim 1, wherein the physical line is an HDMI-CEC line.

3. The electronic device according to claim 1, wherein the notification portion communicates the information when the clock portion counts a change in value of minutes.

4. An electronic device comprising:
   a first clock portion counting time; and
   an acquisition portion that acquires, from an external device having a second clock portion for counting time and having time on the second clock portion set based on time information acquired from outside, information of the time counted by the second clock portion via a physical line
   wherein the acquisition portion acquires the information on at least one of the following occasions: when after the device, by being so operated as to display a time information setting screen, displays the time information setting screen on a display portion; and when the device shifts into a stand-by state, and
   wherein time on the first clock portion is set based on the information acquired by the acquisition portion.

5. The electronic device according to claim 4, wherein the physical line is an HDMI-CEC line.

6. The electronic device according to claim 4, wherein the acquisition portion acquires the information when the second clock portion counts a change in value of minutes.

* * * * *